United States Patent [19]

Kuts

[11] 3,858,474
[45] Jan. 7, 1975

[54] FABRIC CUTTING
[75] Inventor: Mathew Kuts, Akron, Ohio
[73] Assignee: B. F. Goodrich Company, New York, N.Y.
[22] Filed: Feb. 20, 1974
[21] Appl. No.: 444,038

[52] U.S. Cl.................. 83/424, 83/433, 83/508, 83/562, 83/675
[51] Int. Cl........................ B26d 7/06, B23d 19/02
[58] Field of Search ............ 83/424, 433, 508, 562, 83/675

[56] References Cited
UNITED STATES PATENTS
3,757,618  9/1973  Kuts.............................. 83/508 X
3,768,101  10/1973  Kuts.............................. 83/433 X Primary Examiner—Willie G. Abercrombie
Attorney, Agent, or Firm—Joseph Januszkiewicz; W. A. Shira, Jr.

[57] ABSTRACT

The splitting or cutting of rubberized fabric material while it is being conveyed wherein a cutter is journaled on a support for rotation about its axis, and having a portion thereof in cutting engagement with an anvil that is mounted on the carriage for reciprocal movement relative to such cutter to provide for a shearing action. Such anvil supports the material during and after cutting. Such cutter has a plurality of circumferentially spaced linear cutting edges or cutters. A spring on the shaft biases the cutters into shearing engagement with such anvil so that as the fabric material is moved or conveyed past the cutter and anvil, it cuts the material into predetermined widths by a shearing action.

7 Claims, 4 Drawing Figures

Patented Jan. 7, 1975  3,858,474
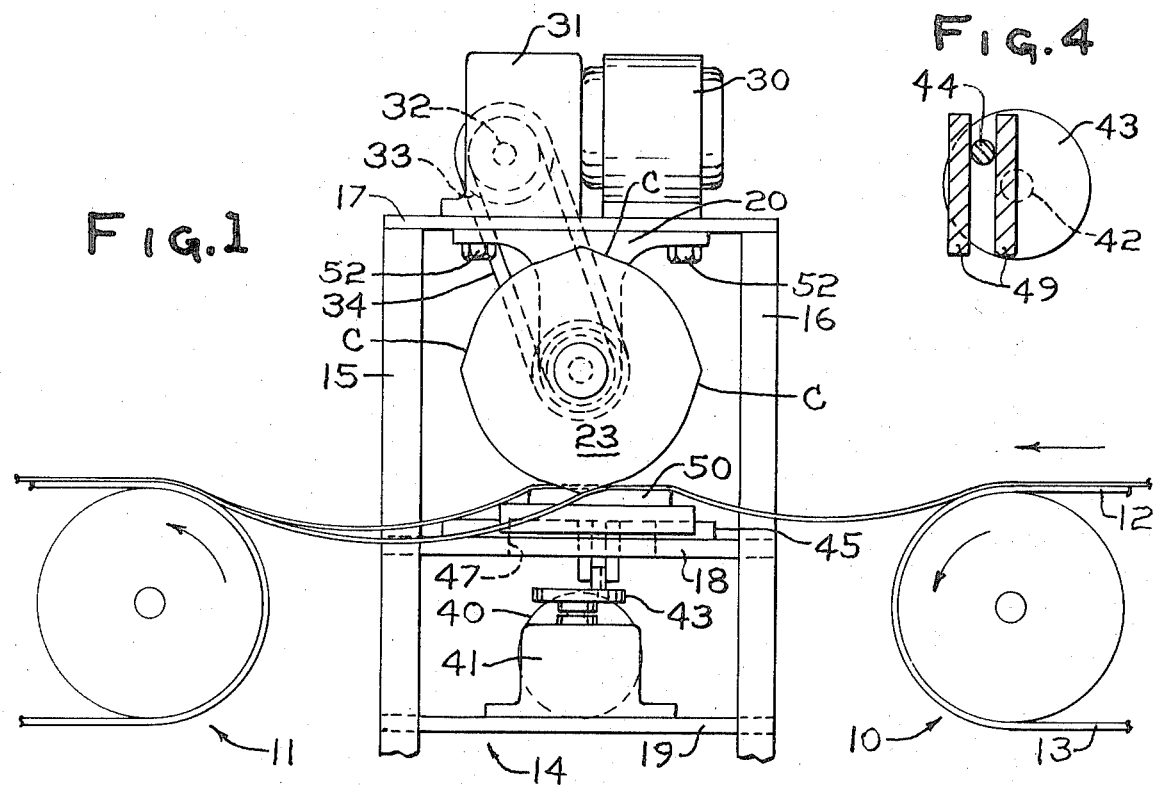
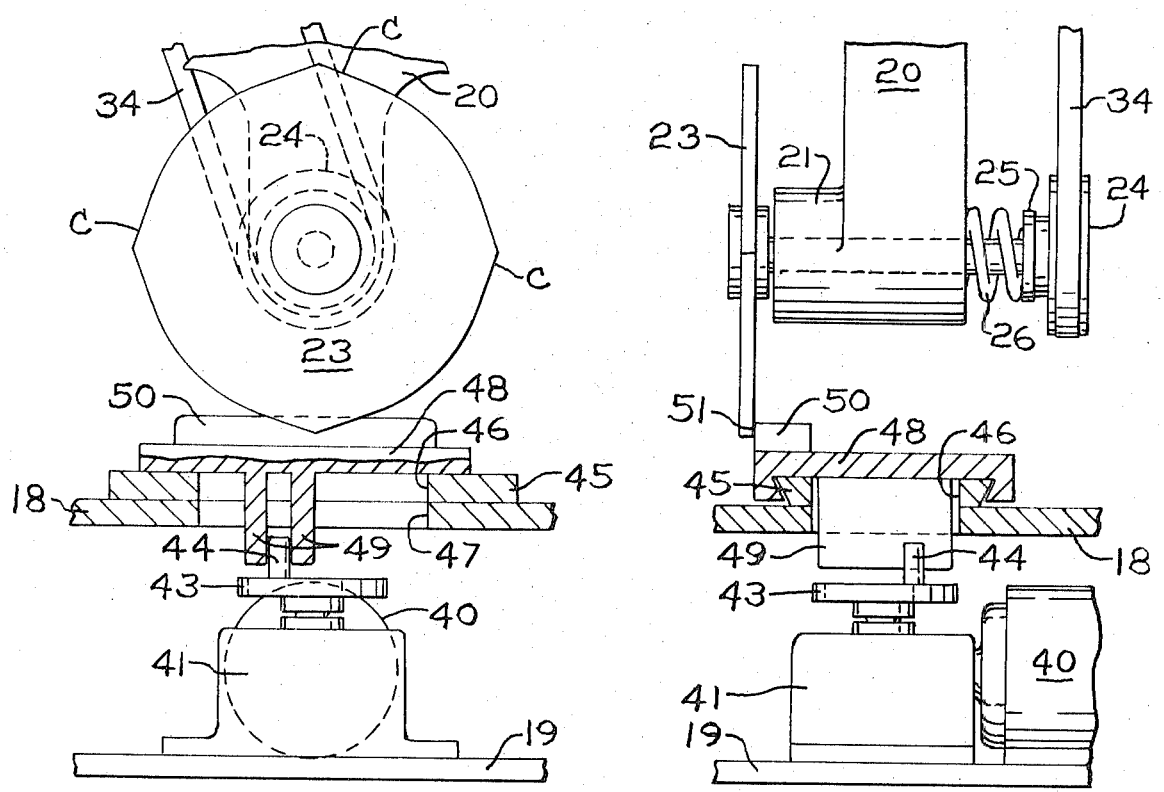
FIG.1 FIG.4 FIG.2 FIG.3

FABRIC CUTTING

BACKGROUND OF THE INVENTION

This invention relates to pneumatic tire manufacture and more particularly to the fabrication of building ply stock normally employed in the construction and manufacture of pneumatic tires. In the manufacture of pneumatic tires, one of the principal members used to build the basic tire carcass is a thin sheet of uncured rubber-like material known as a fabric, building ply or building ply stock. In the manufacture of such building ply, parallel cords of fabric are passed through a pair of rolls in cooperation with calendering rolls which work and calender unvulcanized rubber onto the parallel cords as they pass through the pinch rolls to form a continuous sheet with parallel strands of cord fabric embedded therein. Thereafter, such sheet material is bias cut into sections of fabric which are then spliced end to end to give a building ply or building ply stock with the cords therein located at a desired bias angle relative to the longitudinal center line of the building ply. The layers of fabric are applied to a tire building drum in such a manner that cord members of overlapping plies criss-cross with respect to the cord members above or below. The tire beads are then set against the ends of the plies and the plies turned thereover, Additional plies, chafer strips, sidewall strip, breakers, overhead belts and a thread ply may be applied in varying orders, and stitched thereto. Such carcass is substantially a flat band, wherein the angle is measured between the cords, and the circumferential line around the crown of the tire, in the case of pneumatic passenger tires, is approximately sixty degrees. After the removal of such green tire, the tire is given a toroidal shape during vulcanization or on a second machine prior to vulcanization, wherein the angle after vulcanization is now thirty to thirty-five degrees depending on many factors including drum set. The described process has generally referred to tires manufactured from fabric; however, such process also includes the building of plies which use non-extensible cord materials such as nylon and wire. In the processing of building plies containing wire, processing has been difficult because of the inherent difficulty in cutting wire, which cutting is particularly compounded by the very low bias angle cutting on such stock wherein the cutters tend to push and displace the wire ends, which action distorts the stock.

In the cutting of rubberized cloth fabric, the conventional method of cutting is to use a pair of fingers that lift so that a rapidly rotating cutter disc above the fingers cuts the fabric. Therein the width of the fabric cut presented no problems because the material cut was conducive to be cut by ordinary means whether it was a rotary disc or a guillotine. With the use of wire rather than textile cord, it was found necessary to limit the fabrication of the building plies to a width that was the exact size used in the fabrication of the tire, since it was exceedingly difficult to trim or cut the building ply stock that contained wire. In the instant invention it was found feasible and more economical to fabricate building ply stock in multiples of the actual size needed and to thereafter split or slit such ply stock which contains wire cords into the size of width needed to increase productivity. Such action was facilitated by the use of a reciprocating anvil and a fixed blade that rotated against such anvil as the ply stock material was moved past it.

SUMMARY OF THE INVENTION

The present invention contemplates an apparatus that utilizes a carriage which is mounted on a support frame which carriage is given a reciprocating movement. Such carriage has an anvil mounted thereon for cooperation with a rotating cutter to provide a shearing cut on ply stock that is fed by conveying means toward and past such cutting means. Such rotating cutter is adjustably mounted on a cutter support member. The cutter support member journals a support shaft which has the rotating cutter on one side thereof with a biasing spring on such shaft biasing the cutter into engagement with the cutting edge of the anvil which the building ply stock or fabric material is moved past. The biasing action of the spring with the cutter means in cooperation with the reciprocating anvil facilitates the shearing action. The rotating cutter would have a plurality of circumferentially spaced cutting edges which are linear, giving the cutter a downward shearing action.

BRIEF DESCRIPTION OF THE DRAWINGS

FIG. 1 is a side elevational view of a cutting or slitting apparatus with a portion of the conveying means shown.

FIG. 2 is an enlarged side elevational view of the cutting apparatus with a portion broken away showing the drive means for reciprocating the anvil.

FIG. 3 is an enlarged front elevational view of a portion of the carriage and anvil with the cutting means cooperative therewith, showing the means for effecting the reciprocating movement of the carriage and anvil.

FIG. 4 is a cross sectional view of the eccentric drive means for imparting the reciprocal movement to the carriage, taken on line 4—4 of FIG. 2.

DETAILED DESCRIPTION

Referring to the drawings wherein like reference characters designate like or corresponding parts throughout the several views, there is shown in FIG. 1 a pair of spaced endless conveyor means 10 and 11, each having suitable rollers at spaced ends thereof, driven in the manner old and well-known in the art. Conveyor means 10 has an upper conveying run 12 and a lower return run 13. Suitable guide and support means are provided to guide the belt in its travel. A supporting framework 14 shown generally in FIG. 1 has a pair of spaced upwardly extending support members 15 and 16 with suitable outwardly extending cantilevered supports 17, 18 and 19. Secured to upper support 17 is a downward extending housing 20 which has a boss 21 at its lower end portion. Housing 20 is suitably pivotally mounted on support 17 to adjust the cutting angle of the blade as to be described. The boss 21 of housing 20 journals for rotation a shaft 22, which has a cutter 23 secured to one end thereof for a purpose to be described. The other end portion of shaft 22 has a pulley 24 secured thereto along with a flange member 25. Encompassing shaft 22 between flange 25 and housing 20 is a compression spring 26 which biases cutter 23 rightwardly as viewed in FIG. 3 towards housing 20.

Mounted on upper plate member 17 is a motor 30 having its output connected to a speed reducer 31. Speed reducer 31 has an output shaft 32 connected to a pulley 33 which has its output transmitted via a V-belt 34 to pulley 24 which is keyed or otherwise secured to the shaft 22.

Mounted on the lower support 19 is a motor 40 having its output connected to a speed reducer 41. Speed reducer 41 has its output shaft 42 connected to a circular cam plate 43. Cam plate 43 has an eccentric pin 44 which provides a reciprocating motion in a manner to be described. Mounted on the intermediate support 18 is a dovetailed guideway 45 which is suitably recessed as at 46 along its central portion. Support 18 is similarly recessed as at 47. Mounted for linear movement on guideway 45 is a carriage 48 having a pair of downwardly extending plate members 49—49 which captively engages the eccentric 44, such that as disc 43 rotates, eccentric 44 imparts a rectilinear reciprocating movement to carriage 48 through the cooperation of the plate members 49—49 with eccentric 44. An anvil 50 is secured to carriage 48 for movement therewith. Anvil 50 has a cutting edge 51 that is cooperative with the successive edges of the cutter means 23 to provide for the shearing action that is effective on wire and textile cord alike.

The cutting edge of the anvil 50 may make a slight acute angle with respect to the planar surface of cutter means 23. Cutter means 23 has a plurality of linear cutting surfaces indicated as C such that during the rotation of cutting means 23, a portion of at least one linear surface is at all times in contact with the cutting edge 51 of the anvil 50 while such anvil 50 reciprocates slowly. The anvil 50 does not need sharpening nor replacement for a prolonged period, since a new surface is continually being presented for cooperation with the cutting means 23.

The cutting angle between the cutting means 23 and the anvil 50 may be adjusted as by loosening of bolts 52, pivoting housing 20 relative to its central pivot mounting means on plate 17 and then re-tightening of bolts 52 after the relative position of housing 20 is adjusted.

Various modifications are contemplated and may obviously be resorted to by those skilled in the art without departing from the described invention, as hereinafter defined by the appended claims, as only a preferred embodiment thereof has been disclosed.

I claim:

1. An apparatus for cutting rubberized fabric into at least two long separate continuous lengths comprising a support frame, input conveying means, a discharge conveying means cooperative with said input conveying means to convey fabric to and from said support frame, guide means mounted on said support frame, a carriage mounted on said support frame for reciprocable movement on said guide means, said carriage cooperative with said input conveyor to support fabric conveyed therefrom, power operated means mounted on said support frame and connected to said carriage for reciprocating said carriage on said guide means, anvil means secured to said carriage for movement therewith, a cutter support member mounted on said support frame, cutter means journaled on said cutter support member for rotation thereon, drive means mounted on said cutter support member operatively connected to said cutter means for rotating said cutter means, said anvil means having a linear cutting edge, said cutter means having a plurality of circumferentially spaced cutting edges that are cooperative with said anvil means to perform a shearing action on fabric therebetween and operative to provide a continuous cut on fabric moving between said conveying means, and biasing means connected to said cutter means to bias said cutting edges of said cutter means into shearing contact with said linear cutting edge of said anvil as said cutting edges approach said linear cutting edge of said anvil.

2. An apparatus as set forth in claim 1 wherein said cutter support member is mounted for adjustable movement on said carriage to provide a shearing contact between said adjacent cutting edge of said cutter means with said linear cutting edge of said anvil means as said adjacent cutting edge moves across said linear cutting edge, and said adjacent cutting edge makes an acute angle with said linear cutting edge of said anvil.

3. An apparatus as set forth in claim 2 wherein adjusting means are connected to said cutter support member for adjusting said acute angle.

4. An apparatus as set forth in claim 1 wherein at least one of said cutting edges of said cutter means has a portion thereof in cooperating contact with said linear cutting edge of said moving anvil at all times and making an acute angle therewith.

5. An apparauts for cutting rubberized fabric comprising a support frame, motive means mounted on said frame having an output, a carriage mounted on said support frame for movement thereon, cam means interconnecting said output with said carriage for reciprocating said carriage on said support frame, anvil means mounted on one edge of said carriage for movement therewith, said anvil means presenting a linear cutting edge, a cutter means journaled on said support frame for rotation thereon, said cutter means having a plurality of circumferentially spaced cutting edges, drive means mounted on said support frame operatively connected to said cutter means for rotating said cutter means, and biasing means cconnected to said cutter means for biasing said cutter means in shearing contact with said linear cutting edge of said anvil means as said anvil means is reciprocated by said carriage in cooperative shearing contact with said rotating cutter.

6. A bias cutting apparatus as set forth in claim 5 wherein the contact between any of said cutting edges of said cutter means and said anvil defines an acute angle.

7. A bias cutting apparatus as set forth in claim 5 wherein a plane normal to the axis of rotation of said cutter means and passing through said linear cutting edge.

* * * * *